Figure 1:
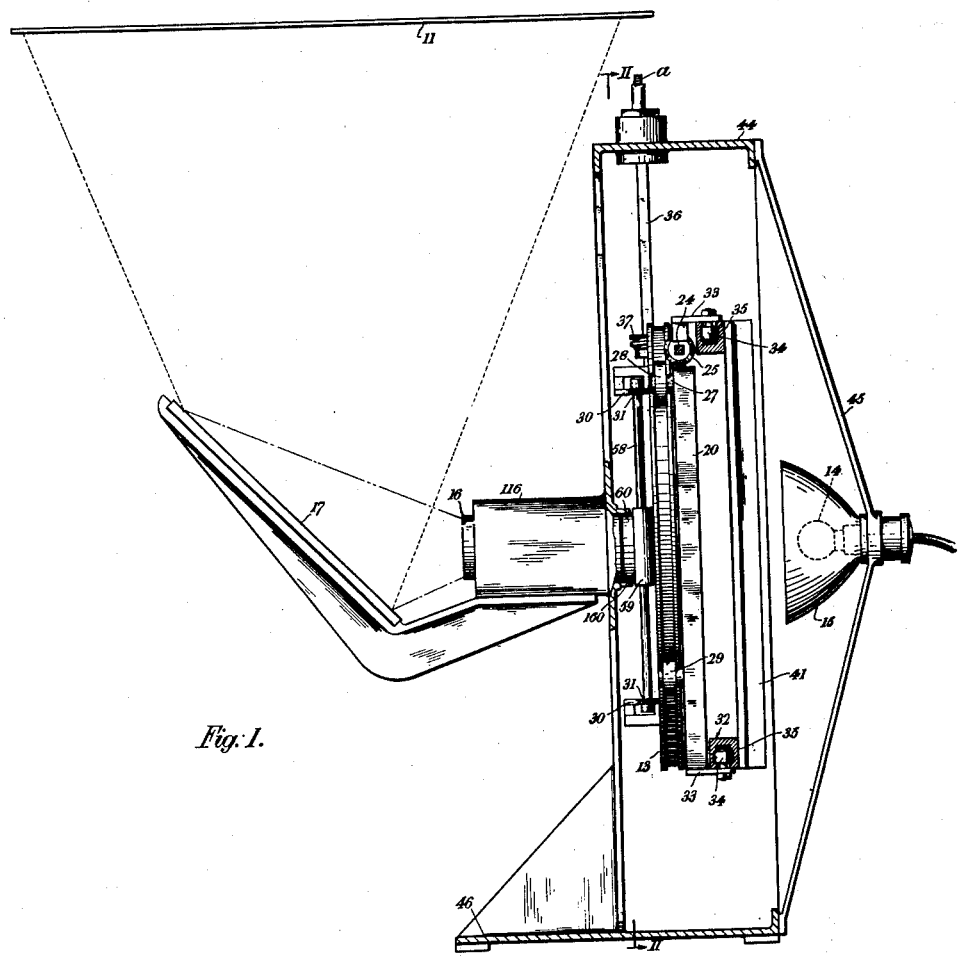

Dec. 23, 1941.  A. GRAVES  2,267,649

MAP AND MAP MOUNTING FOR USE IN THE NAVIGATION OF AIRCRAFT

Filed Aug. 21, 1940  5 Sheets-Sheet 3

Arnold Graves
Inventor

By Watson, Cole, Grindle & Watson
ATTYS

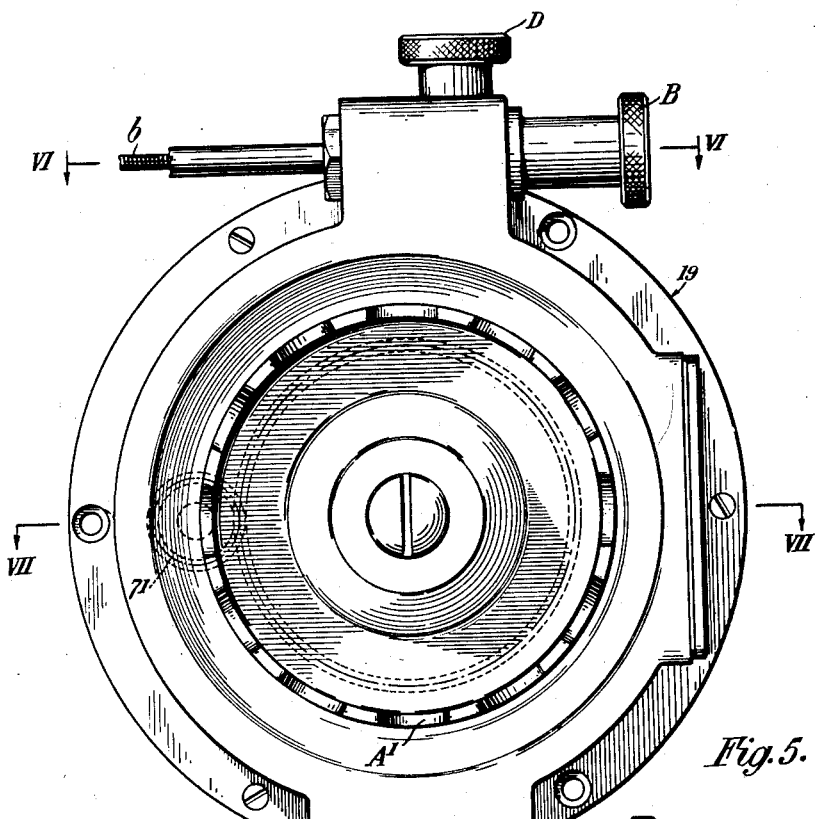
Fig. 5.
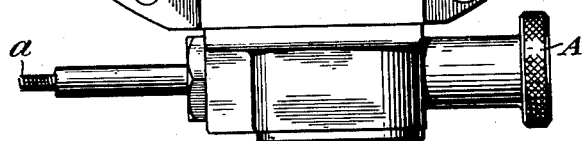
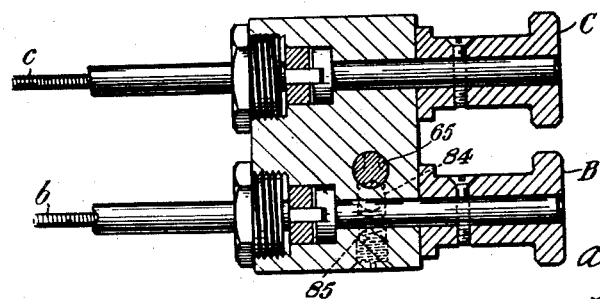
Fig. 6.

Dec. 23, 1941.  A. GRAVES  2,267,649
MAP AND MAP MOUNTING FOR USE IN THE NAVIGATION OF AIRCRAFT
Filed Aug. 21, 1940  5 Sheets-Sheet 5

Arnold Graves
Inventor

By Watson, Cole, Grindle & Watson
ATTYS

Patented Dec. 23, 1941

2,267,649

UNITED STATES PATENT OFFICE 2,267,649

MAP AND MAP MOUNTING FOR USE IN THE NAVIGATION OF AIRCRAFT

Arnold Graves, Surbiton, England, assignor of one-half to Alltools Limited, Brentford, Middlesex, England Application August 21, 1940, Serial No. 353,559
In Great Britain January 14, 1939

9 Claims. (Cl. 40—28)

This invention is concerned with navigational apparatus for use on aircraft or ships, and has for its object to provide an apparatus which, utilizing a small map only, will enable the navigator to ascertain at any time the point on the ground over which he is flying or the point on the ocean at which his ship is located.

It has been proposed to use on motor cars, aeroplanes, launches or like vehicles, a small scale transparent map in the form of a film which can be wound from one spool to another to bring different portions of the map into register with an optical projector by means of which an enlarged image of that portion of the map is thrown on a screen, the spools being carried on a slide which is movable laterally in relation to the projector and also rotatable relatively to the projector. With this apparatus it is possible to feed the map forward, by rotation of the spools, in the direction of any desired course but no means are provided whereby the navigator can ascertain at any time his exact position on the map. According to another proposal, a small scale map in the form of a film was arranged to be fed forward from one spool to another by an automatic drive operated by a motor or in communication with a moving part of an automobile, the map being observed through an optical enlarging device and it being stated that this apparatus could be used on aeroplanes. No provision was however made for lateral or rotational movement of the map relatively to the enlarging device.

According to the invention use is made of a map or maps or composite aerial photograph reduced to a very small scale, and an optical enlarging device is provided on the aircraft or ship to enable the pilot or navigator to read the maps. The optical device may operate on the principle of a projector or as a microscope. Means are also provided for enabling the navigator to adjust the map to the course to be followed and to feed it forwards relatively to the enlarging device in the direction of the line defining the course at a rate corresponding to the ground speed of the aircraft or ship, the feed mechanism embodying a setting device calibrated in terms of ground speed with the result that, provided he knows his starting point and the ground speed at which the aircraft or ship is travelling, the navigator can determine his position on the map at any time during the voyage.

Where a microscope is employed as the enlarging device, the movement necessary for bringing a selected point on the map into register with the intersection of cross wires or other datum point defined by the enlarging device, and for setting the map to the correct course, may be applied either to the map itself or to the microscope. Likewise, the forward feed may be applied either to the map or to the microscope. Preferably however a projector is employed, and in this case it is preferred to apply the adjusting movements and the feed movement to the map.

It will be appreciated that a small portion only of the map need be under observation at any given time, so that a single map, provided it is to a sufficiently small scale, may be sufficient for a long flight. Navigation will therefore be considerably facilitated and the disadvantage of having to carry a quantity of bulky maps will be eliminated.

It is preferred to employ a manually controlled feed mechanism for the map, which is operable at intervals by the navigator and calibrated in terms of distance or time.

In the case of an aircraft, before starting his flight the navigator, knowing the air speed at which he intends to fly and the direction and speed of the wind at the height at which he intends to fly, can by a simple calculation determine the course he must follow and the ground speed at which he will be flying along that course. Similarly in the case of a ship the navigator can calculate his ground speed knowing his actual speed of travel and the prevailing conditions of current and wind. He therefore only needs to set the map to the desired course which can readily be done by means of a suitable index and scale, to adjust the map so as to bring the starting point into register with the datum point of his optical enlarging device, and to adjust the setting device of the feed mechanism to the determined ground speed. Then he can ascertain his position at any time during the flight by operating the feed mechanism until the indicator associated therewith indicates the time which has elapsed since his departure, or if the indicator is calibrated in terms of distance until it indicates the distance flown in that time which can easily be calculated.

If it is necessary at any time to alter the speed or course during flight, this can be done by suitable adjustment of the map and of the setting device of the feed mechanism.

Figure 2:
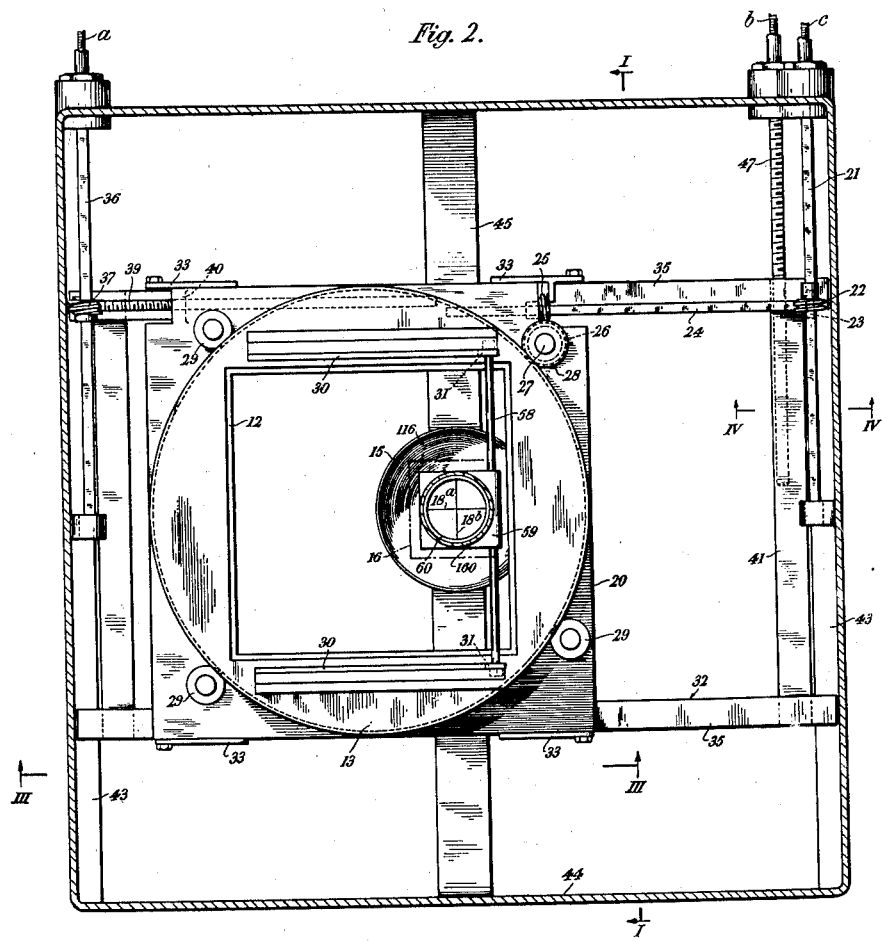
Figure 3:
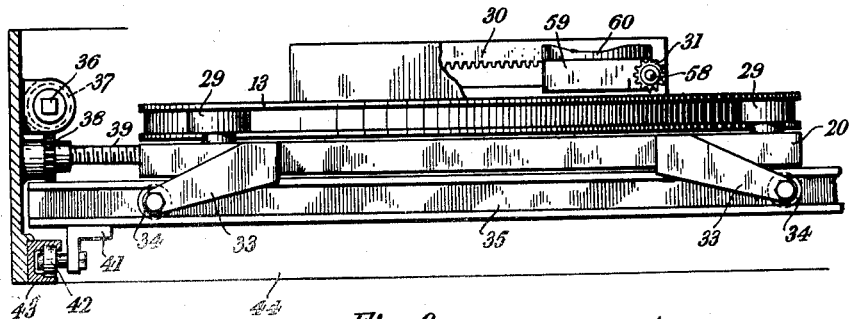
Figure 4:
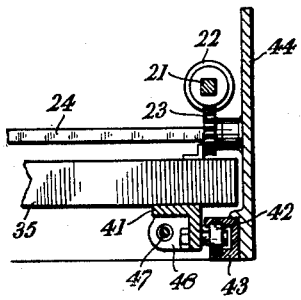
Figure 10:
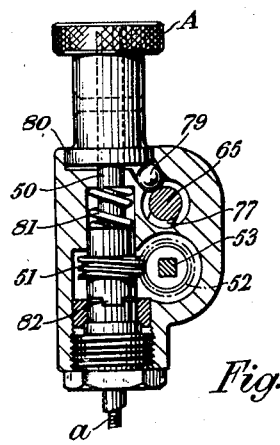
Figure 9:
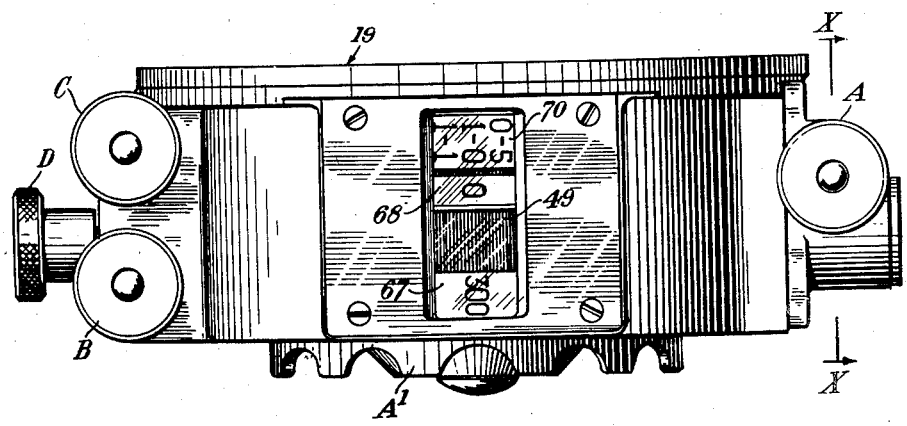
Figure 7:
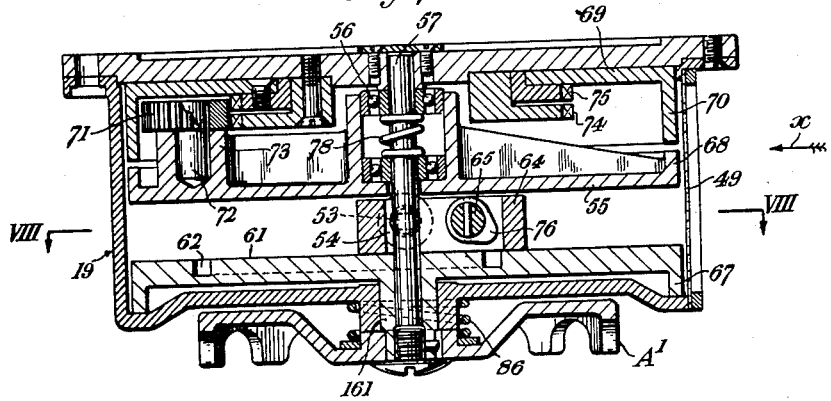
Figure 8:
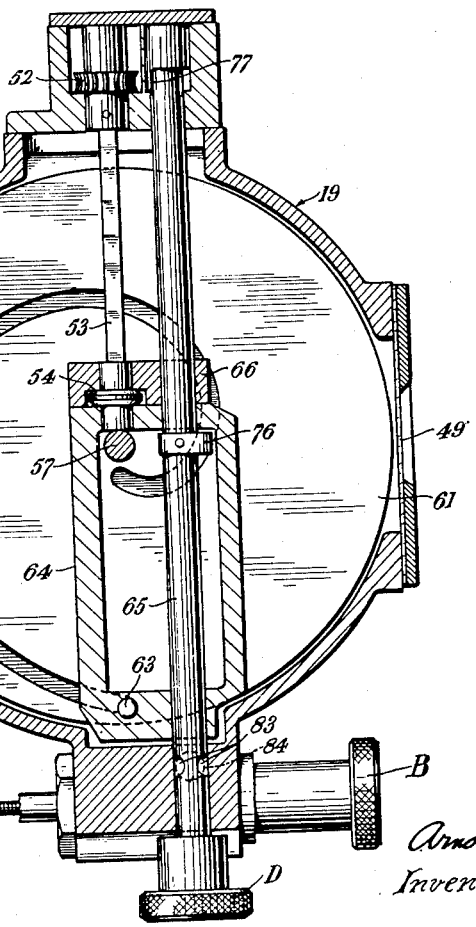

One form of navigational apparatus according to the invention will now be described in detail, by way of example, with reference to the accompanying drawings, in which Figure 1 is a section taken along the line I—I in Figure 2 showing the map carrier in side elevation, Figure 2 is a section taken along the line II—II in Figure 1 and shows the map carrier in front elevation, Figures 3 and 4 are sections taken respectively along the lines III—III and IV—IV in Figure 2, Figure 5 is a bottom plan view of the control box, Figures 6 and 7 are sections taken respectively along the lines VI—VI and VII—VII in Figure 5, Figure 8 is a section taken along the line VIII—VIII in Figure 7, Figure 9 is a side view looking in the direction of the arrow x in Figure 7, and Figure 10 is a section taken along the line X—X in Figure 9.

Figure 1 shows the general arrangement of the map carrier and projector. 11 represents a translucent screen which is to be imagined as forming part of the surface of a navigator's table in the aircraft. An enlarged image of the map, which consists of a photographic plate (not shown) supported on a suitable seating 12 (see Fig. 2) in a turntable 13, is projected on to the under surface of the screen 11 by means of the projector. This consists of a lamp 14, reflector 15, lens system located in a tube 16 and mirror 17. The tube 16 is carried by a rearwardly projecting square boss 116 mounted on a casing 44 which encloses the map carrier, and has attached to it a bracket 45 for supporting the lamp 14 and reflector 15. Within a forwardly extending boss 160 on the casing 44 is rotatably mounted an annulus 60 which carries cross wires 18ᵃ, 18ᵇ (see Fig. 2) defining by their intersection the datum point of the optical enlarging system.

The map carrier is capable of linear adjustment in two directions at right angles and of rotational adjustment to bring any selected point on the map into register with the datum point and to set the map to the desired course. Means are also provided for feeding the map forwards at a rate corresponding to the ground speed of the aircraft. The feed mechanism and the devices for adjusting the map are all operated from a common control box 19, shown in Figs. 5 to 10. This control box is provided with three control knobs A, B, C, which operate on the map carrier through the intermediary of flexible shafts a, b, c, respectively. The knob A serves for communicating forward feed to the map and also for one of the linear adjustments. The knob B serves for effecting lateral adjustment of the map relatively to the datum point. The knob C serves for effecting rotational adjustment of the map to set it to the desired course.

Referring once more to Figs. 1 to 4, the turntable 13 which acts as the map carrier is rotatably mounted on a carriage 20. To the flexible shaft c which controls the rotational movement of the map is connected a squared shaft 21 on which is mounted a worm 22 cooperating with a worm-wheel 23 on a second squared shaft 24. The shaft 24 carries a worm 25 meshing with a worm wheel 26 mounted on a spindle 27 carrying a friction disc 28, which communicates the drive to the turntable 13, rollers 29 on the carrier 20 serving to support and guide the turntable. It is of course necessary to provide indicating means for enabling the navigator to determine that the map has been set to the correct course. This is achieved as follows.

On the top of the turn-table 13 are mounted two parallel racks 30 with which cooperate pinions 31 mounted on a spindle 58 extending at right angles to the racks and carrying a slide 59 to which is fixed the annulus 60 which carries the cross wires 18ᵃ, 18ᵇ, these cross wires extending parallel to the racks 30 and to the spindle 58 respectively. It will be appreciated that with this arrangement whatever the position of adjustment of the knobs A, B, C, the cross wire 18ᵃ and hence the image of that cross wire thrown on the screen 11, will always remain parallel to the racks and therefore parallel to a given line on the map. The racks are set parallel to the North and South line on the map and the screen is provided with markings to indicate compass bearings, so that the intersection of the image of the cross wire 18ᵃ with these markings will show the course to which the map has been set.

The carriage 20 is slidable in a fore and aft direction on a rectangular framework 32. On the carriage 20 are mounted downwardly depending brackets 33 carrying rollers 34 which engage in channel shaped guides 35 (see Fig. 3), on the rectangular framework 32 for the purpose of guiding the movement of the carriage. This fore and aft feed movement is communicated to the carriage from the flexible shaft a. This is connected to a squared shaft 36 carrying a worm 37 meshing with a worm-wheel 38 on a screw-threaded spindle 39. This cooperates with an internally threaded abutment 40 on the carriage 20 so that rotation of the flexible shaft a will cause the carriage 20 to move backwards and forwards relatively to the rectangular framework.

To each side of the rectangular framework 32 is fixed a downwardly projecting angle member 41, one of which is shown in Fig. 4, carrying rollers 42 which engage in a channel shaped rail 43 fixed to the casing 44. As shown in Fig. 1 the casing 44 is provided with an outstanding foot 46 by means of which it can be secured to the floor of the navigator's cabin. The rollers 42 and rails 43 permit of lateral adjustment of the rectangular framework 32 relatively to the casing 44. The flexible shaft b which controls this adjustment is fixed to a threaded spindle 47 which cooperates with an abutment 48 (see Fig. 4) fixed to the rectangular framework 32, so as to effect lateral movement of the framework when the flexible shaft b is rotated.

It will be appreciated therefore that by turning the knob C until the image of the cross wire 18ᵃ comes opposite the desired bearing angle marked on the screen, the navigator can set the map to the desired course. Then, by turning the knobs A and B and so effecting fore and aft lateral adjustment of the map, any selected point thereon may be brought into register with the intersection of the cross wires 18ᵃ, 18ᵇ.

After having flown for a given interval of time the navigator can feed the map forward at a rate corresponding to the ground speed of the aircraft, by turning the knob A until the appropriate time indication comes opposite a window 49 in the control box 19 (see Fig. 9).

As shown in Figs. 8 and 10 the knob A is connected to a spindle 50 carrying a worm 51 cooperating with a worm-wheel 52 on a squared shaft 53. On this squared shaft is slidably mounted a friction wheel 54 which drives a friction disc 55 which is mounted by means of a ball bearing 56 on a spindle 57. The friction wheel 54 and friction disc 55 constitute an infinitely variable friction gear which can be set in accordance with the ground speed by means of a knob A¹. This knob is fixed to a boss 161 projecting forwardly from a disc 61 having a scroll shaped groove 62 with which cooperates a pin 63 fitted to a slide 64 mounted to slide on a spindle 65. An extension 66 of the slide 64 embraces the friction wheel 54. It will be appreciated therefore that as the knob A¹ is turned the slide 64 will be moved up and down as shown in Fig. 8 by the scroll cam, with the result that the radial position of the friction wheel 54 relatively to the friction disc 55 will be varied. The disc 61 is formed with a flange 67 which is calibrated in terms of ground speed, the indications being visible through the window 49, as shown in Fig. 9. In this case it is assumed that the navigator intends to fly at a ground speed of 300 M. P. H. and that the knob A¹ has consequently been turned to bring this figure opposite the window and set the friction drive to this speed.

The friction disc 55 is formed with a projecting flange 68 and is coupled to a disc 69, likewise having a projecting flange 70, by means of an epicyclic reduction gear having a ratio of 60 to 1. The flanges 68 and 70 can be seen through the window 49 in the control box and these flanges are calibrated in terms of time. The flange 68 bears the figures 0 to 9 representing units of minutes. On the flange 70 are figures representing hours and tens of minutes. A complete revolution of the friction disc 55 therefore represents 10 minutes and a complete revolution of the disc 69 represents 10 hours. When the pilot requires at any time after starting the flight to adjust the map so as to show him his present position, all that he needs to do is to turn the knob A until the figures representing the time which has elapsed since the start of his flight (one hour in the case of Fig. 9) appear on the flanges 70 and 68 through the window 49.

The epicyclic gearing coupling the discs 55, 69 consists of a pinion 71, rotatably mounted on a stud 72 which is fixed in a boss 73 projecting rearwardly from the disc 55, a fixed exteriorly toothed ring 74 and a second exteriorly toothed ring 75 fixed to the disc 69, the two rings both cooperating with the pinion 71, the ring 74 having 60 teeth and the ring 75 having 61 teeth.

It will be appreciated from what has been stated above that the knob A serves two functions, namely to effect preliminary fore and aft adjustment of the map and also to effect forward feed of the map. It will be appreciated that it is desirable to be able to turn the knob A without actuating the time dials and also to be able in other circumstances to reset the time dials by turning the knob A without altering the position of the map. To this end a control knob D is provided which is fixed to the spindle 65. This spindle carries two cams 76, 77 which are normally inoperative so that rotation of the knob A will both move the map and turn the time dials. On turning the knob D over to its first alternative position the cam 76 operates on the friction disc 55 to force it upwards as seen in Fig. 7, against the action of a spring 78 thereby withdrawing the friction disc 55 from the friction wheel and interrupting the drive from the knob A to the time dials. In the other alternative position of the knob D the cam 77 is effective to displace a ball 79 which coacts with a flange 80 on the knob A, thereby lifting the shaft 50 against the action of a spring 81 and uncoupling a dog clutch 82 which normally couples the shaft 50 to the flexible shaft a. This movement uncouples the drive to the map but is insufficient to bring the worm 51 out of mesh with the wormwheel 52 so that the drive to the time dials is maintained. The cam spindle 65 is provided with three recesses 83, a ball 84, pressed by a spring 85 (see Fig. 6), serving to engage in these recesses so as to hold the cam spindle against accidental displacement from its normal or its two alternative positions. Similarly a spring 86 serves to hold the knob A¹ for setting the ground speed against accidental displacement from any position to which it may have been set.

Although the invention has been described and illustrated with reference to its application to the case in which a flat map is employed, it may in some cases be desirable to use a curved map which will give a more accurate representation of the portion of the earth's surface over which the flight is to be made. In this case the map would, as before, be mounted on a turn-table but the carrier for the turn-table would then have to execute a curved movement instead of a straight line movement relatively to the member supporting it and this member would similarly have to execute a curved movement, in a direction at right angles to that of the carriage, relatively to the fixed carrier. For this purpose the carrier and supporting member could be formed with racks curved to the proper form and driven by pinions suitably connected to the flexible shafts which transmit the movement from the control box.

In the drawings the exact location of the control box in relation to the map carrier has not been shown because the control box can of course be placed in any position convenient to the navigator and this position will vary in accordance with the needs of individual cases.

While, in the arrangement illustrated, the datum point is defined by the intersection of cross wires associated with the lens system, it will be understood that a mark on the screen may be used as the datum point.

Also, although the invention is of primary importance in connection with the navigation of aircraft, it may nevertheless also be applied on board ship. Thus, by using as the chart a projected enlargement of a curved map, greater accuracy can be obtained than with a flat chart.

What I claim as my invention and desire to secure by Letters Patent is:

1. In navigational apparatus for use on aircraft or ships, of the type comprising a carrier for a map and an optical enlarging device for enabling the navigator to read the map, means for effecting relative rotation of the carrier and enlarging device to set the map to the intended course, means for bringing into register any selected point on the map and a datum point defined by the enlarging device, a feed mechanism for effective relative travel of the carrier and datum point in the direction of the line defining the course on the map, an elapsed time indicator operatively connected to said feed mechanism, a manually adjustable ground speed indicator, and means actuated by said ground speed indicator and operatively interposed between said feed mechanism and said time indicator for adjusting the rate of feed of said carrier in relation to the movements of said time indicator.

2. In navigational apparatus for use on aircraft or ships, of the type comprising a carrier for a map and an optical enlarging device for enabling the navigator to read the map, means for effecting relative rotation of the carrier and enlarging device to set the map to the intended course, means for bringing into register any selected point on the map and a datum point defined by the enlarging device, a manually operable feed mechanism for effecting relative travel of the carrier and datum point in the direction of the line defining the course on the map, an elapsed time indicator operatively connected to said feed mechanism, a manually adjustable ground speed indicator, and means actuated by said ground speed indicator and operatively interposed between said feed mechanism and said time indicator for adjusting the rate of feed of said carrier in relation to the movements of said time indicator.

3. In navigational apparatus for use on aircraft or ships, of the type comprising a carrier for a map and an optical enlarging device for enabling the navigator to read the map, means for effecting relative rotation of the carrier and enlarging device to set the map to the intended course, means for bringing into register any selected point on the map and a datum point defined by the enlarging device, a manually operable feed mechanism for effecting relative travel of the carrier and datum point in the direction of the line defining the course on the map, an elapsed time indicator operatively connected to said feed mechanism, a manually adjustable ground speed indicator, and means actuated by said ground speed indicator and operatively interposed between said feed mechanism and said time indicator for adjusting the rate of feed of said carrier in relation to the movements of said time indicator, said last means comprising an infinitely variable friction drive.

4. In navigational apparatus for use on aircraft or ships, of the type comprising a carrier for a map and a fixed support for the carrier, means for effecting rotational adjustment of the carrier relative to the support to set the map to a desired course, means for effecting linear adjustment of the carrier relative to the support in two mutually perpendicular directions, indicating means for defining a datum point for determining the setting of the map, a feed mechanism for traversing the carrier along the support in one of the directions in which it is linearly adjustable thereon, operating means for said feed mechanism, a ground speed indicator, and means actuated by said ground speed indicator and operatively interposed between said feed mechanism and said operating means for adjusting the rate of feed of said carrier in relation to the movements of said operating means.

5. In navigational apparatus for use on aircraft or ships, of the type comprising a carrier for a map, a fixed support for the carrier, a screen, and an optical projector for throwing on the screen an enlarged representation of the map, means for effecting rotational adjustment of the carrier relative to the support to set the map to a desired course, cross wires mounted on the carrier in the path of the light beam entering the projector, means for constraining the cross wires to maintain a constant angular relationship to the support despite angular adjustment of the carrier, a feed mechanism for traversing the carrier along the support in one of the directions in which it is linearly adjustable thereon, operating means for said feed mechanism, a ground speed indicator, and means actuated by said ground speed indicator and operatively interposed between said feed mechanism and said operating means for adjusting the rate of feed of said carrier in relation to the movements of said operating means.

6. In navigational apparatus of the type comprising a map carrier, a fixed support therefor, and an optical enlarging device for enabling the navigator to read the map, a control mechanism for the map carrier comprising a control box remote from the carrier, a manually operable control element associated with the control box for effecting rotational adjustment of the carrier relative to the support, manually operable control members associated with the control box for effecting linear adjustment of the carrier relative to the support in two mutually perpendicular directions, a setting device calibrated in terms of ground speed for varying the linear movement communicated to the carrier by one of the last mentioned control members, an indicator for showing the amount of movement communicated to the carrier by the said control member, and flexible shafts for communicating the adjusting movements from the control box to the carrier.

7. In navigational apparatus for use on aircraft or ships, of the type comprising a carrier for a map and an optical enlarging device for enabling the navigator to read the map, means for effecting relative rotation of the carrier and enlarging device to set the map to the intended course, means for bringing into register any selected point on the map and a datum point defined by the optical enlarging device, a feed mechanism for effecting relative travel of the carrier and datum point in the direction of the line defining the course on the map, operating means for said feed mechanism, a manually adjustable ground speed indicator, and means actuated by said ground speed indicator and operatively interposed between said feed mechanism and said operating means for adjusting the rate of feed of said carrier in relation to the movements of said operating means.

8. Apparatus as defined in claim 4, said feed mechanism constituting also one of said means for effecting linear adjustment of the carrier, and said operating means having associated therewith an indicator for showing the amount of the traversing movement imparted to said carrier.

9. Apparatus as defined in claim 4, said feed mechanism constituting also one of said means for effecting linear adjustment of the carrier, said operating means having associated therewith an indicator for showing the amount of the traversing movement imparted to said carrier, and means for selectively disconnecting said operating means from said feed mechanism and from said indicator.

ARNOLD GRAVES.